United States Patent [19]

Tulkki

[11] Patent Number: 4,689,158

[45] Date of Patent: Aug. 25, 1987

[54] DECANTING DEVICE FOR SEPARATION OF PHASES OF DIFFERENT DENSITIES

[75] Inventor: Viljo S. Tulkki, Oulu, Finland

[73] Assignee: A. Ahlstrom Corp., Karhula, Finland

[21] Appl. No.: 746,061

[22] Filed: Jun. 18, 1985

[30] Foreign Application Priority Data

Jul. 3, 1984 [FI] Finland ................................ 842667

[51] Int. Cl.⁴ .................... B01D 17/028; B01D 19/00; C02F 1/40

[52] U.S. Cl. ...................................... 210/802; 127/13; 127/34; 209/52; 209/199; 210/188; 210/522; 210/537; 210/539

[58] Field of Search ............... 55/52, 199, 206; 127/2, 127/9, 12, 13, 34; 210/776, 801, 802, 188, 521, 522, 537, 538, 539, 540, 928

[56] References Cited

U.S. PATENT DOCUMENTS

| | | | |
|---|---|---|---|
| 2,213,808 | 9/1940 | Von Stietz | 210/522 X |
| 2,479,126 | 8/1949 | Lipscomb | 210/522 X |
| 2,793,186 | 5/1957 | Dunnell et al. | 210/538 X |
| 3,666,108 | 5/1972 | in'Veld | 210/522 X |
| 3,794,167 | 2/1974 | Olgard et al. | 210/522 X |
| 3,919,084 | 11/1975 | Bebech | 210/802 |
| 4,115,279 | 9/1978 | Toft | 210/521 |
| 4,202,778 | 5/1980 | Middelbeek | 210/522 |
| 4,333,835 | 6/1982 | Lynch | 210/522 X |
| 4,357,241 | 11/1982 | Knudsen et al. | 210/802 X |
| 4,492,635 | 1/1985 | Stigebrandt | 210/521 |

FOREIGN PATENT DOCUMENTS

| | | | |
|---|---|---|---|
| 518923 | 3/1931 | Fed. Rep. of Germany . | |
| 658300 | 3/1938 | Fed. Rep. of Germany . | |
| 1052360 | 3/1959 | Fed. Rep. of Germany . | |
| 189766 | 4/1888 | France | 210/522 |
| 314961 | 9/1969 | Sweden . | |
| 617358 | 5/1980 | Switzerland . | |
| 1092299 | 11/1967 | United Kingdom . | |

Primary Examiner—Richard V. Fisher
Assistant Examiner—W. Gary Jones
Attorney, Agent, or Firm—Nixon & Vanderhye

[57] ABSTRACT

A decanting vessel for separation of liquid phases of different densities. The decanter vessel is provided with several conically-shaped separation levels disposed one on top of the other and provided with openings connecting the passages, alternately at the outer periphery and at the center of the separation levels. The liquid phases are thereby caused to flow from one passage to the next, consecutively, in a generally sepentine path. Pipes are disposed in the uppermost portion of each of the separation levels to carry the lighter phase to the top of the vessel.

14 Claims, 1 Drawing Figure

DECANTING DEVICE FOR SEPARATION OF PHASES OF DIFFERENT DENSITIES

TECHNICAL FIELD

The present invention relates to a decanting device the vessel of which is provided with several separation levels supplied on top of each other for separation of two liquid phases and/or a liquid and a gas phase of different densities.

The invention also relates to a method for separating by decanting liquid phases and/or a liquid phase and a gas phase mixed with each other.

BACKGROUND ART

By known methods liquid phases mixed with each other are principly separated either by distilling in processes where the boiling points of the phases adequately differ from each other, or by decanting in processes where the specific gravities of the phases are different.

The choice of the separation method is determined by various technical and economic factors and the separation capacity required of the process.

Decanting does not in general require heat energy and has no detrimental impacts on the properties of the separated liquid phases. It is primarily employed when the separation capacity required of the process can be achieved by it. Typical applications of the decanting method are separation of oil from waste waters and recovering turpentine-compounds from the condensates of cellulose mills.

The prior art decanters are either vertical or horizontal decanters or combinations of these.

In the most commonly employed vertical decanters, e.g. the Swedish Linder decanter, the decanter vessel is remarkably high compared to its diameter. The liquid to be decanted is supplied beneath the phase boundary from which point the lighter phase rises up to the surface and the heavier phase descends to the bottom. The operation principle is, however, disadvantageous for separation of micro drops of the lighter phase, as the drops which rise at a constant velocity determined by their viscosity and specific gravity ratios must travel a long way through the heavier phase and further, the downward flow of the heavier phase decreases the rising velocity of the drops. For these reasons the residence time in the vertical decanter must be long and the decanter vessel large in relation to the volume of the phases to be separated.

The dimensions of the known horizontal decanters differ from the ones described above, i.e. the area of the decanter vessel is large in relation to the height of the vessel. In a typical application the vessel is a long basin, into one end of which the phases are supplied. The phases flow in the longitudinal direction of the vessel and the heavy phase is discharged at the opposite end of the vessel. A horizontal decanter solves the problems of separation of the lighter phase microdrops but an essential drawback of the solution is the size of the decanter vessel and thus the large space it requires in industrial applications.

Reliable operation of a decanter in varying process conditions presupposes that the layer thickness of the lighter phase in the decanter exceeds a minimum which is dependent of the density ratio of the phases to be separated. Even in horizontal decanters this results in unreasonable and uneconomical dimensions which are difficult to apply in practice. Furthermore, a horizontal decanter with optimum dimensions is difficult to construct pressure-proof.

More advanced solutions are disclosed in U.S. Pat. Nos. 4,132,651 and 4,115,279 in which attempts have been made to improve the separation capacity by dividing the flow of the phases to be separated in several parallel flow passages whereby the theoretical separation capacity is improved in relation to the number of the flow passages. In these disclosures the problems arise in having an equal amount of flow divided in each of the adjacent flow passages. Exact division of the flow would presuppose a remarkably high flow resistance and thus a turbulent flow which, however, results in emulsification which in turn affects the operation of the decanter and decreases its separation capacity. Emulsification is especially problematic in decanting the turpentine-containing condensates of a cellulose mill.

A solution of the above described type is disclosed also in U.S. Pat. No. 4,357,241. The decanter vessel of this disclosure is circular and the flow in the adjacent passages takes place radially towards the periphery or the center of the vessel. However, the problems of dividing the flow and the the emulsification are not eliminated with this device.

A common feature of the known decanter constructions is that the lighter phase is removed through an overflow and the heavier phase through another overflow in such a way that height ratios of the phase boundary created in the vessel are determined by the height differences of the overflows.

In the known applications, the gases ended up in the vessel with the phases must rise up in bubbles through both liquid phases. This results in disturbances in the desired laminar flow and in certain conditions, detrimental emulsion may also be formed in the boundary surface of the phases.

DISCLOSURE OF THE INVENTION

The object of the present inventions is to provide a decanter, the structure and operation of which is improved compared to the known devices.

A characteristic feature of the decanter according to the present invention is that the separation levels placed on top of each other are arranged to form independent decanting elements of consecutive passages in which openings connecting one passage to the next are at alternate ends of the passages. Preferably the separation levels are circular and the openings connecting one passage to the next are at the outer periphery and at the inner periphery, in turn. Preferably the decanter also utilizes pipes disposed at the top-most point of the separation levels to guide the lighter phase collected at the undersurface of the levels to the top part of the vessel.

A characteristic feature of the method according to the invention is that the mixture of the phases to be decanted is caused to flow through passages connected in series on top of each other in which the light phase is separated from the mixture.

The decanter according to the invention is constructed to separate the phases in several passages connected in series through all of which the whole liquid amount to be decanted flows. By this method the disadvantages in the structure and flow and the hazard of emulsification of the known vertical and horizontal decanters discussed above are avoided. At the same time the decanter can be dimensioned for a decisively shortened residence time in relation to the desired separation capacity.

The structure and operation of the decanter according to the invention is described in detail below with reference to the accompanying drawing.

BEST MODE OF CARRYING OUT THE INVENTION

Figure 1:
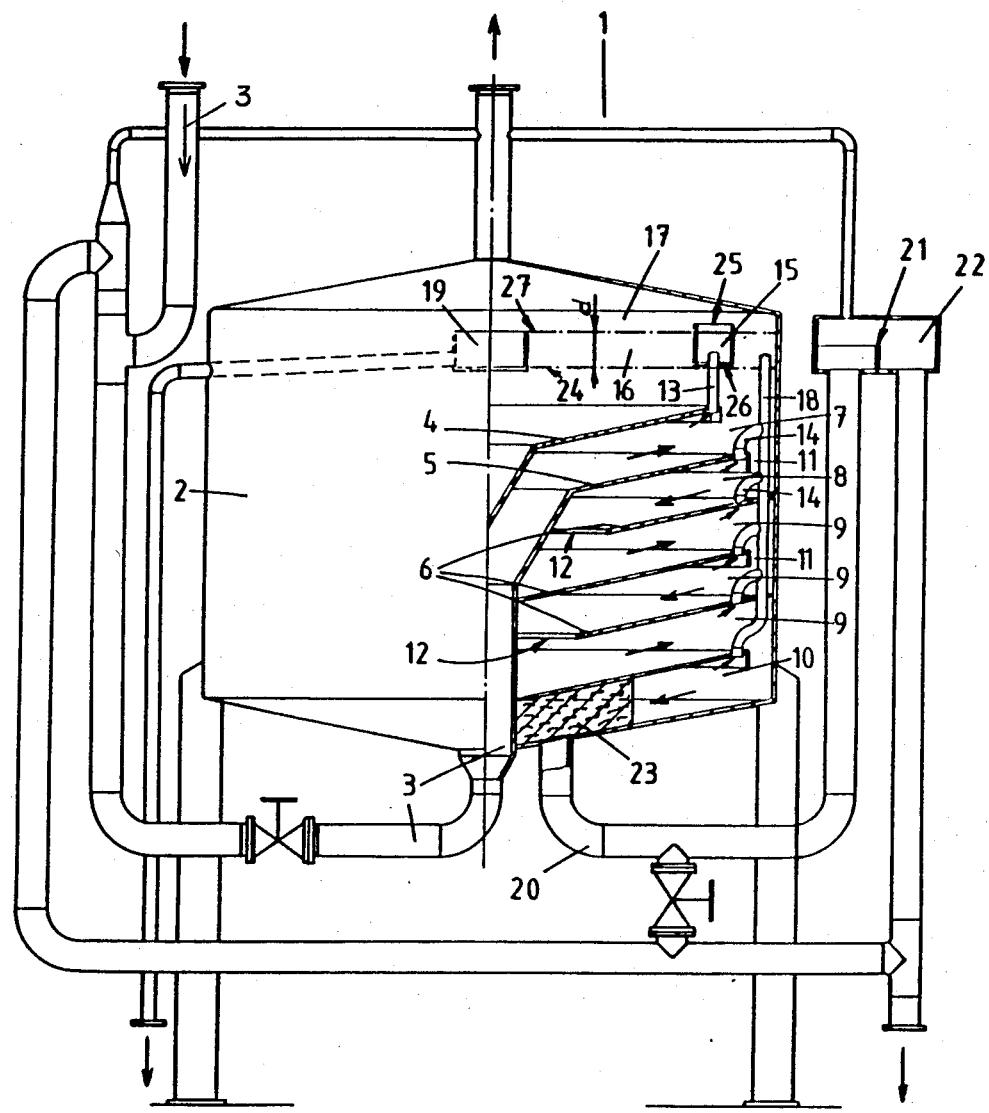
FIG. 1 is a partial sectional view of a schematic illustration of an embodiment of the invention.

The liquid phase mixture to be decanted is supplied in the vessel 2 of a decanter 1 through an inlet pipe 3 disposed at the center axis of the decanter from which the flow is radially divided into a passage 7 between a top-most separation level 4 having the form of an inclined cone and a following lower separation level 5. The lighter phase in the form of large drops rises to form a film onto the undersurface of the separation level 4 and due to its smaller specific gravity it flows through a pipe 13 disposed at the top-most point of the inclined separation level 4 from the undersurface of the level into a vertical gas cylinder 15 disposed in a light phase layer 16. Both ends 25, 26 of the cylinder are open. The lighter phase flows further under the lower edge 26 of the cylinder into the light phase separation layer. The undersurface of the light phase layer 16 is limited by the boundary surface 24 of the light phase and the heavy phase, and the top surface of the light phase layer is limited by the liquid surface 27.

The main portion of the gases flowing into the decanter with the liquid phases is separated in the first passage 7 onto the undersurface of the separation level 4, from which the gases are discharged through the pipe 13 and the top end 25 of the cylinder 15 to the gas space 17 of the decanter without disturbing the liquid flow and further out of the decanter. The top edge 25 of the gas cylinder is above the liquid surface 27.

After the passage 7 the liquid phase mixture, from which a part of the lighter phase has been separated, flows to the following passage 8 through an opening 11 at the outer periphery of the second separation level 5. In the second passage 8 the phase mixture flows towards the center of the decanter vessel and further to a third passage 9 through an opening 12 disposed at the center of a third separation level 6. The passages 9, 10 defined by the following separation levels 6 are also connected in series in such a way that the openings 11, 12 connecting one passage to another are alternately located at the radially inner and outer ends of the passages enabling the liquid phase mixture to flow from one passage to the next in a generally serpentine path.

The liquid phase mixture to be decanted flows through these passages 8, 9, 10, which are connected in series, to the discharge pipe 20 for the heavier phase. The separation levels 5, 6 operate as independent decanting elements according to the same principle as the separation level 4, i.e. the lighter phase separated onto the undersurface of the level rises through pipes 14 disposed at the peripheries of the levels to a shared collector pipe 18 and further to the light phase layer 16 in the top part of the decanter.

The number of the separation levels 4, 5, 6 and the distances between them are chosen according to the separation capacity required of the decanter and the properties of the liquids to be decanted.

Pilot scale decanters have proved that a separation level added in the lower end of the decanter collects 15 to 25% of the lighter phase collected by the previous lowest level.

The lighter phase is discharged from the light phase layer 16 in overflow through a skimming basin 19 disposed in the top part of the decanter. Reliable operation of the skimming basin in varying flow conditions presupposes an adequate lighter phase thickness d which prevents the heavier phase from rising to the skimming basin. When operating with small density differences the boundary surface 24 of the phases moves very easily.

The heavier phase which is removed via discharge pipe 20 rises over an adjustable overflow 21 disposed in a liquid level guard 22 outside the decanter. The height of the overflow determines the layer thickness d of the lighter phase.

In applications where the surface tension of the lighter phase is distinctly lower than that of the heavier phase the last passage 10 of the decanter can be filled e.g. with dense steel wool or demister network 23.

Due to the lower surface tension, part of the micro drops still in the heavier phase sticks to the surface of the wool or the network. The film formed onto the surface rises slowly onto the undersurface of the lowest separation level and further in pipe 18 to the top part of the decanter.

The invention is not limited to the embodiment presented here as an example, only, but several modifications may be made of the invention within the scope of protection defined by the accompanying patent claims. Thus the separation levels need not be circular in cross section but they can be e.g. rectangular levels and the liquid mixture to be decanted flow in the passages between them from one end of the passage to another.

We claim:

1. A method of separating two liquid phases and a gas phase of different densities mixed with each other by decanting comprising the steps of causing the mixture of phases to be decanted to flow through an inlet pipe disposed at a central axis of a decanting vessel to a topmost decanting element; thereafter causing the mixture to flow consecutively through a series of decanting elements arranged one on the top of the other within the vessel, the flow direction in consecutive passages alternating against the outer periphery and against a center portion of the decanting vessel; whereby the lighter phase is separated from the remaining heavier phases and discharging the heavier liquid phase at the bottom of the decanting vessel from a lowermost decanting element.

2. A method as recited in claim 1 wherein the position of a boundary layer of the separated liquid phases is determined by discharging the heavier liquid phase into a device provided with an overflow.

3. A method as recited in claim 2 wherein the position of said boundary layer of the liquid phases is adjusted by the position of a skimming basin disposed in a top part of the vessel to remove the lighter liquid phase by maintaining an upper open end of a vertical cylinder disposed in the lighter phase, above the liquid surface and a lower open end of said cylinder above the boundary layer of the liquid phases.

4. A decanting device comprising a vessel having a top and a bottom; several conical separation levels supplied on top of each other in the vessel for separation of a mixture of two liquid phases and a gas phase of different densities arranged to form independent decanting elements connected in series and constituting consecutive passages: an inlet pipe disposed at a center axis of the decanting vessel for leading the whole flow of the mixture of the two liquid phases and the gas phase to be separated to a topmost decanting element, a discharge pipe connected to an outlet of a lowermost decanting element at the bottom of the decanting vessel for discharging a separated heavier phase out of the decanting vessel; means defining openings connecting each passage to the following passage, located alternately at the outer periphery and at the center of the separation levels for causing liquid phases of the mixture to flow from one passage to the next passage underneath in a generally serpentine path; and, pipes disposed at the top-most point of the separation levels to guide the lighter phase collected at the undersurface of the levels to the top part of the vessel.

5. A decanting device as recited in claim 4 wherein a vertical cylinder, both ends of which are open, is disposed at the top end of a pipe disposed at the first separation level in the top part of the vessel, the light phase flowing beneath said cylinder to the light phase separation layer and the gas phase being discharged above said cylinder to the gas space of the decanter.

6. A decanting device as recited in claim 4, wherein the pipes disposed at the top-most points of the separation levels are connected by one or several collection pipes to each other through which the lighter phase rises to the upper part of the vessel.

7. A decanting device as recited in claim 4 wherein a skimming basin is disposed in the top part of the vessel to remove the light liquid phase.

8. A decanting device as recited in claim 4 wherein an adjustable overflow is disposed outside the vessel in the discharge pipe of the heavier phase.

9. A decanting device as recited in claim 4 wherein demister elements are provided in a part of the passages, the operation of said elements being based on the difference of surface tensions of the liquid phases to be separated.

10. A decanting device comprising a vessel having a top, a bottom and a center axis; several conical separation levels supplied on top of each other in the vessel for separation of a mixture of two liquid phases of different densities arranged to form independent decanting elements defining consecutive passages; an inlet pipe disposed at the center axis of the decanting vessel for leading the whole flow of the mixture of the two liquid phases to be separated to a topmost decanting element; a discharge pipe connected to an outlet of a lowermost decanting element at the bottom of the decanting vessel for discharging a separated heavier phase out of the decanting vessel; means defining openings connecting each passage to the following passage, located alternately at the outer periphery and at the center of each separation level; and, pipes disposed at top-most points of the separation levels to guide the lighter phase collected at the undersurface of the levels to the upper part of the vessel.

11. A decanting device as recited in claim 10 wherein the pipes disposed at the top-most points of the separation levels are connected by one or several collection pipes to each other through which the lighter phase rises to the upper part of the vessel.

12. A decanting device as recited in claim 10 wherein a skimming basin is disposed in the top part of the vessel to remove the light liquid phase.

13. A decanting device as recited in claim 10 wherein an adjustable overflow is disposed outside the vessel in the discharge pipe of the heavier phase.

14. A decanting device as recited in claim 10 wherein demister elements are provided in a part of the passages the operation of said elements being based on the difference of surface tensions of the liquid phases to be separated.

* * * * *